Dec. 30, 1924.

G. J. RACKHAM

MOTOR VEHICLE

Filed Nov. 30, 1923     4 Sheets-Sheet 2

1,521,126

Inventor
George J. Rackham
by Bauer & Bauer
Attys.

Dec. 30. 1924.

G. J. RACKHAM

MOTOR VEHICLE

Filed Nov. 30, 1923  4 Sheets-Sheet 4

1,521,126

Patented Dec. 30, 1924.

1,521,126

UNITED STATES PATENT OFFICE.

GEORGE JOHN RACKHAM, OF CHICAGO, ILLINOIS, ASSIGNOR TO YELLOW COACH MANUFACTURING COMPANY, OF CHICAGO, ILLINOIS, A CORPORATION OF ILLINOIS.

MOTOR VEHICLE.

Application filed November 30, 1923. Serial No. 677,597.

*To all whom it may concern:*

Be it known that I, GEORGE J. RACKHAM, a subject of the King of England, residing at Chicago, in the county of Cook and State of Illinois, have invented certain new and useful Improvements in Motor Vehicles, of which the following is a specification.

This invention has to do with improvements in motor vehicles. It has to do particularly with improvements in the driving mechanism and the arrangement and positioning thereof with respect to the chassis and body carried thereby.

The invention has reference more particularly to an arrangement of the driving mechanism which will make it possible to mount the body lower down than heretofore, while at the same time maintaining the necessary clearance between the differential housing, and other parts.

The invention relates more particularly to improvements in the construction of the chassis and mounting of the bodies in such motor vehicles as coaches and the like, which are of relatively large size, but it will presently appear that certain of the features are not necessarily limited to this type of vehicle. However, for purposes of convenience in illustration and explanation, I will refer to the features of the invention as embodied within the construction of a motor coach.

One of the objects of the invention is to place the engine and immediately associated driving mechanism off center in the chassis so as to bring the transmission control lever off center and close to one end of the front seat of the vehicle. This will make it possible to place the driver at the extreme end of the front seat and still bring the controls into position for convenient manipulation, without the necessity of special connections between the transmission lever and the transmission housing. In other words, this will make it possible to use that type of transmission control in which the lever extends directly upwards from the gear box, and at the same time bring said lever well over to one side of the vehicle and into position for manipulation by the driver located at the end of the front seat.

Another object of the invention is to place the differential housing closer to one side of the vehicle than the other, in other words, off center. Owing to the fact that this housing is of relatively large size the bottom of the body must be so placed as to give the necessary clearances at all times and notwithstanding the flexure of the springs. By placing the differential housing to one side of the machine it is possible to so design the body as to bring the side portion of one of the seats directly above this housing. This will make it possible to allow the floor line to be lowered considerably and still provide the desired clearance above the remaining portions of the rear axle. With this arrangement it also becomes possible to use a center aisle type of body construction and still make use of the lowered floor position, since the floor of the aisle can be carried clear back and over the rear axle, the differential housing being located to one side and beneath one of the seats.

The placing of the differential mechanism off center is also related to the placing of the engine and transmission housing off center, since it is desired to provide a practically straight line drive from the transmission to the differential. Furthermore, by placing the drive shaft off center and in a direct line between the engine and the differential, the universal joint, if any, in the drive shaft, is also placed off center and can be accommodated beneath one of the side seats, where additional clearance will be available and still make it possible to use the lowered floor level.

Other objects and uses of the invention will appear from a detailed description of the same, which consists in the features of construction and combinations of parts hereinafter described and claimed.

In the drawings:

Fig. 1 illustrates the features of the invention as applied to a center aisle type of construction;

Figure 1:
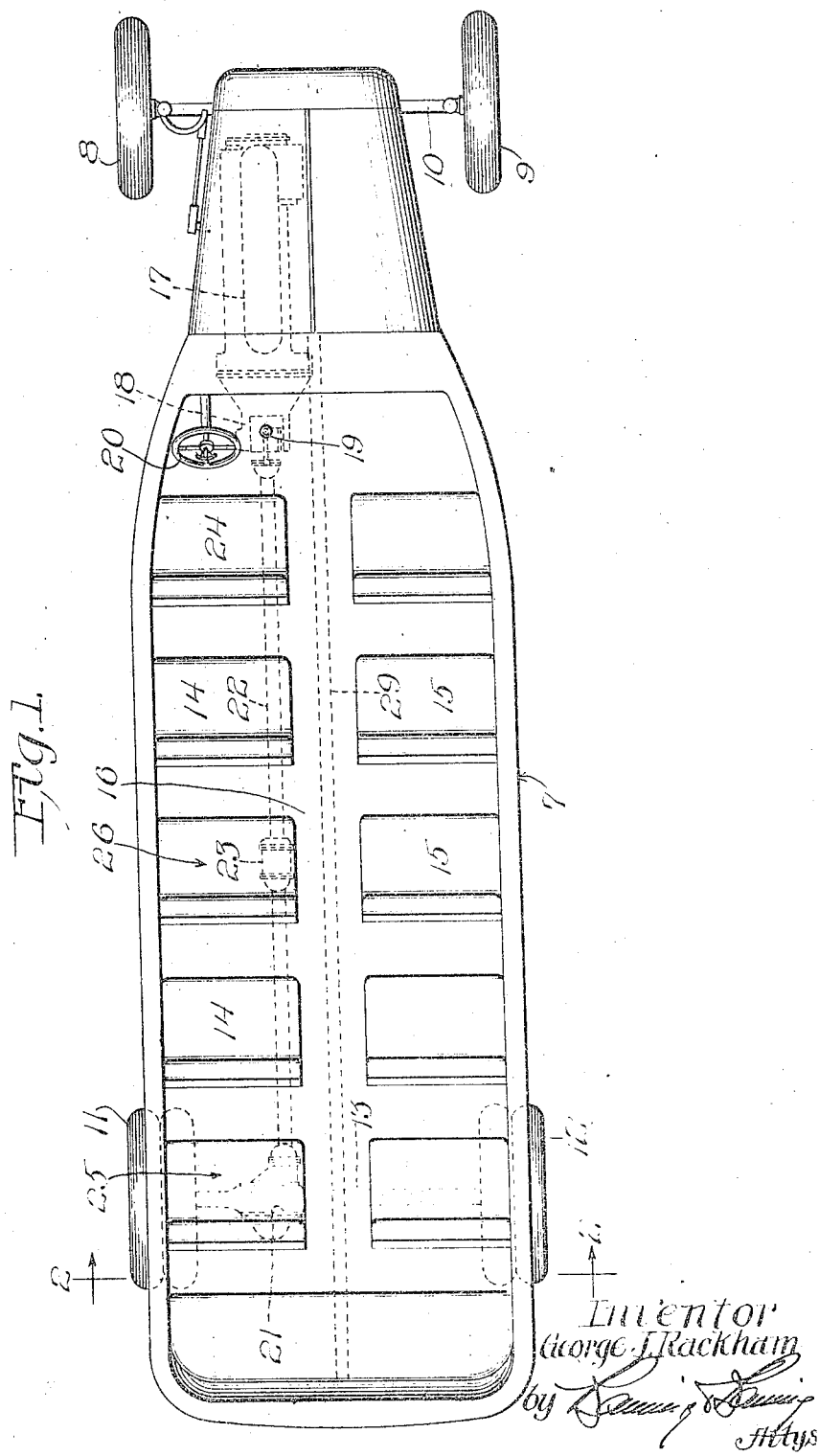
Figure 1 shows a plan view of a motor coach embodying the features of the present invention, the top portion thereof being removed, and shows by dotted lines, the position of the engine, transmission, drive shaft, differential and universal joint.
Figure 2:
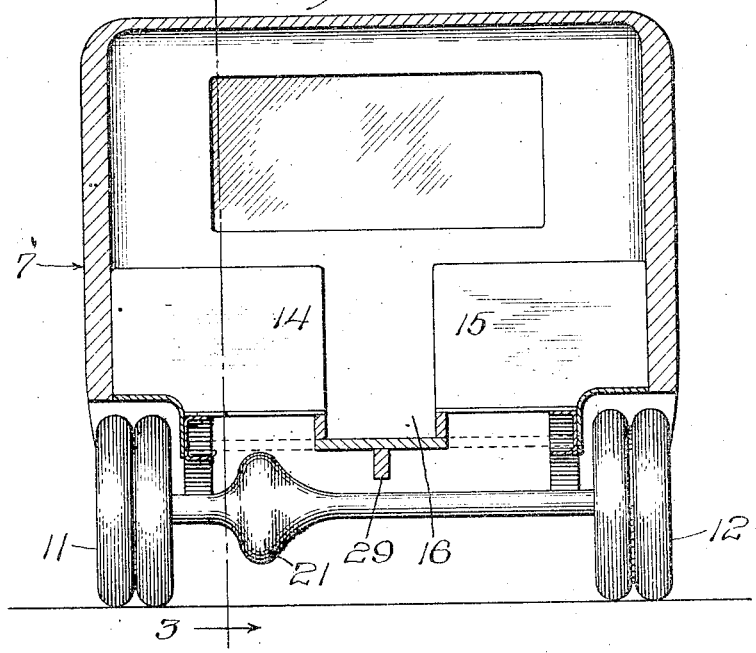
Fig. 2 shows a cross section taken on the line 2—2 of Fig. 1, looking in the direction of the arrows.
Figure 3:
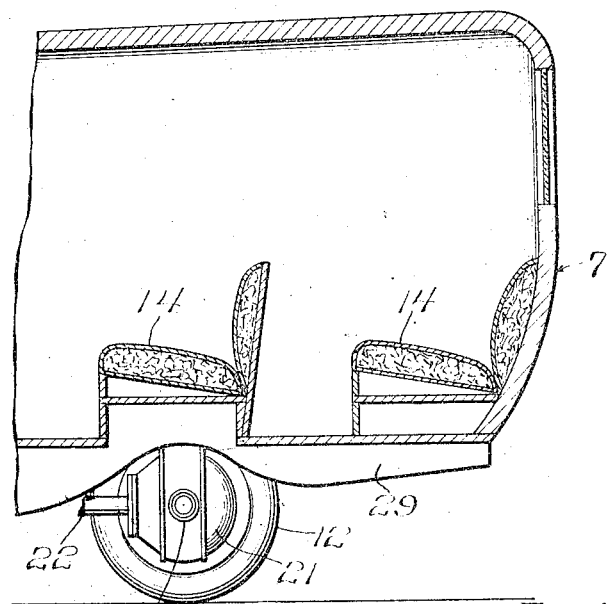
Fig. 3 shows a fragmentary longitudinal section taken on the line 3—3 of Fig. 2, looking in the direction of the arrows.

Referring first to the coach construction shown in Figs. 1, 2 and 3, the body 7 is provided with the usual front wheels 8 and 9, front axle 10, rear wheels 11 and 12, and rear axle 13. The construction shown in these figures is provided with a series of relatively short side seats 14 along one side and other side seats 15 along the other side, there being a center longitudinal aisle 16 between the side seats. Usually this aisle is located along the center of the vehicle.

The engine is shown diagrammatically at 17. The transmission 18 is placed at the rear end of the engine and the usual transmission control handle 19 reaches upwardly from the transmission housing. The steering wheel 20 is provided with the proper steering connections to the front wheels.

There is also provided the differential housing 21 in the rear axle, the drive shaft 22 reaching from the transmission to the differential housing, and the universal joint 23 in the drive shaft.

According to the features of the present invention, I place the engine, transmission, drive shaft, universal joint, and differential housing, off center, so that these parts are carried closer to one side of the chassis than the other. As a result, the transmission control handle 19 and steering wheel 20 are both brought to a point where they are convenient of access to the driver seated at the extreme end of the front seat 24. This makes it possible to place the driver at the point where he will least interfere with the use of seat space by the passengers, and at the same time at a point where he is able to take care of the proper controls with the least amount of interference from the other passengers. As a result the safety and convenience of operation are increased besides which the earning capacity of the vehicle is increased.

The differential housing 21 is placed directly beneath one of the seats 25. This can be done owing to the fact that the differential housing is off center. The floor of the center aisle 16 can be placed at a level which will properly clear the rear axle 13, and the additional amount of clearance necessary for the differential housing is provided by reason of the fact that the same is placed under the rear seat 25. Inasmuch as this differential housing and rear seat are located off center, the center aisle may be carried clear back and over the rear axle at the relatively low elevation thus made possible.

Inasmuch as both the engine and differential housing are located off center the drive shaft 22 and universal joint 23 may also be placed off center and to one side of the position of the center aisle. This makes it possible to place the universal joint 23 beneath the position of one of the side seats 26, so that the additional clearance, if any, necessary for the universal joint can be secured without having to raise the floor level of the aisle or the floor level between the seats.

Figure 5:
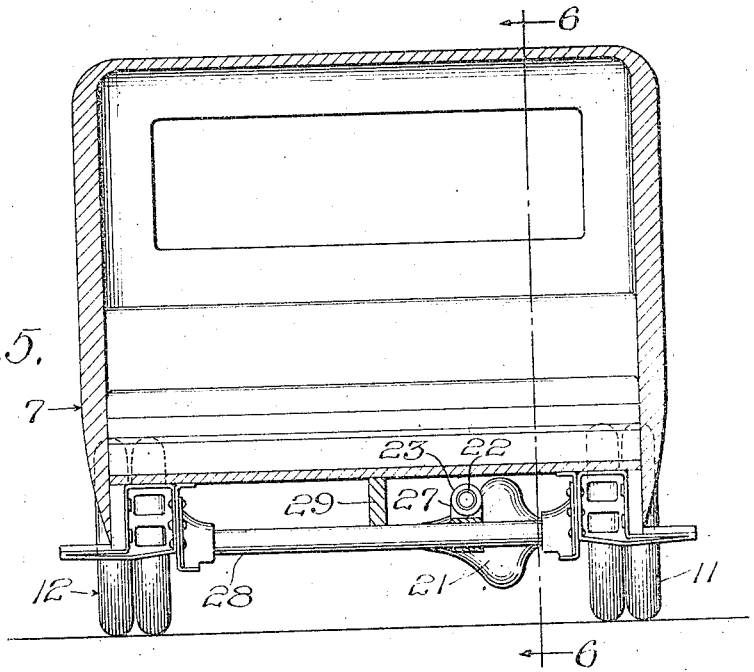
Fig. 5 shows a cross section taken on the line 5—5 of Fig. 4, looking in the direction of the arrows.

A suitable bracket 27 may be carried by one of the cross frame members 28 in order to support the drive shaft at a point immediately behind the position of the universal joint 23, as clearly shown in Fig. 5.

Figure 4:
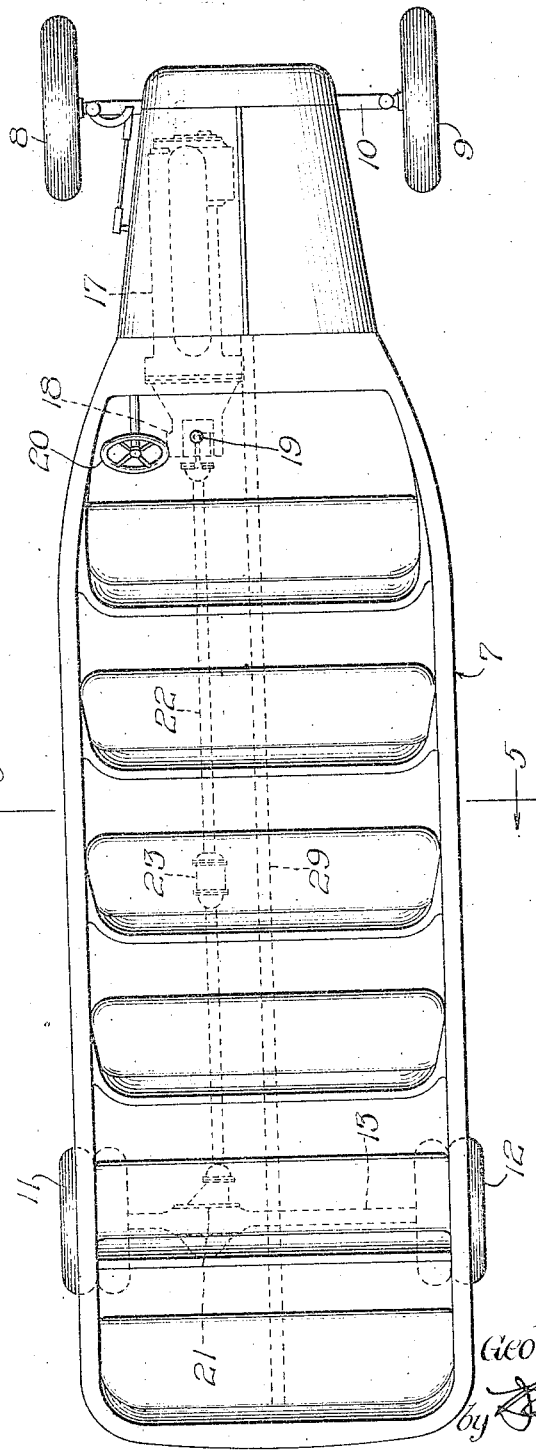
Fig. 4 shows a view similar to that of Fig. 1 with the exception that it illustrates the features of the invention as applied to a coach construction without center aisle.
Figure 6:
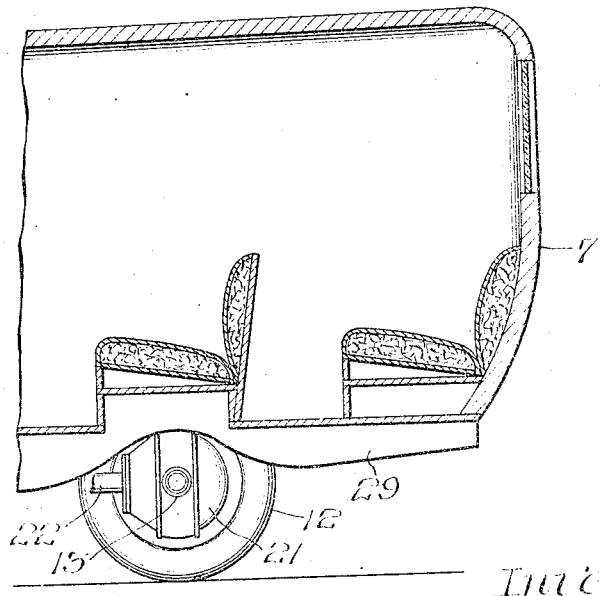
Fig. 6 shows a fragmentary section taken on the line 6—6 of Fig. 5, looking in the direction of the arrows.

In the modified construction shown in Figs. 4, 5, and 6, the center aisle is dispensed with and each of the seats is carried the full width of the body. With this type of construction suitable side doors should be provided all of which is according to standard coach practice, and for this reason is not illustrated in detail.

It will be noted, however, that in the modified construction of Figs. 4, 5 and 6, the engine, transmission, drive shaft, universal joint, and differential housing are all located off center as in the previous arrangement.

In connection with both types of construction, I have also illustrated a central longitudinally extending frame member 29 which reaches along the full length of the body beneath the center aisle. By placing the parts off center ample clearance is provided for this frame member 29, so that the strength and stiffness of the body are greatly improved.

In the particular constructions illustrated in the drawings of this case I have shown the transmission as being a unit with the engine and placed directly behind the engine, so that the control post 19 reaches directly up from the transmission to a point convenient for the operator. I also contemplate as being within the scope of my invention any arrangement in which the transmission is placed further back, and is located under one of the seats so as to give the necessary clearance without having to raise the floor level. In such case the transmission would be connected to the control post 19 by means of suitable links or other connections.

Attention is also called to the fact that in the particular construction illustrated the differential ring gear is located at the left side of the differential pinion, (when facing forward in the vehicle) this being the standard construction so as to give forward drive with the propeller shaft turning in the same direction as the engine. Under the circumstances, the largest diameter of the differential housing is located to the left of the center line of the drive shaft 22, all of which is clearly evident from examination of Figs. 1 and 4. This being the case, it is possible to bring the maximum diameter of the differential housing under one of the rear seats without having to place the engine and drive shaft as far off center of the vehicle as would otherwise be necessary.

While I have herein shown and described only certain embodiments of the features of my present invention, still I do not intend to limit myself to the same, except as I may do so in the claims.

I claim:

1. In a motor vehicle, the combination of a chassis including front steering wheels and rear driving wheels, of an engine mounted in the front portion of the chassis to the left side of the center line thereof, said engine having a normal direction of rotation in a clockwise direction when looking at the front of the vehicle, a transmission unit at the rear end of the engine and substantially in line therewith, a control handle reaching upwardly from said transmission unit at the left side of the center line of the vehicle, a steering wheel located in close proximity to the transmission control handle aforesaid, a differential pot in the rear axle located to the left side of the center line of the vehicle and substantially in line with the engine and transmission aforesaid, a drive shaft reaching directly from the transmission to the differential pot, a universal joint in said drive shaft, both the drive shaft and universal joint being located in line with the engine, transmission, and differential pot, and a body mounted upon the chassis and including cross seats one of which is located directly above the differential pot and another directly above the universal joint, and another of which seats is located at the left side of the vehicle in proximity to the transmission control handle and steering wheel, a longitudinally extending body frame member beneath the center line of the body, and a floor for the central portion of the body and between the seats, whereby said floor may be placed at a relatively low elevation, the differential pot and universal joint being accommodated beneath the seats aforesaid, and whereby the transmission control handle and steering wheel may be brought adjacent to the left end of the front seat aforesaid, substantially as described.

2. In a motor vehicle, the combination of a chassis including front steering wheels and rear driving wheels, of an engine mounted in the front portion of the chassis to the left side of the center line thereof, said engine having a normal direction of rotation in a clockwise direction when looking at the front end of the vehicle, a transmission unit at the rear end of the engine and substantially in line therewith, a control handle reaching upwardly from said transmission unit at the left side of the center line of the vehicle, a steering wheel located in close proximity to the transmission control handle aforesaid, a differential pot in the rear axle located to the left side of the center line of the vehicle and substantially in line with the engine and transmission aforesaid, a drive shaft reaching directly from the transmission to the differential pot, a universal joint in said drive shaft, both the drive shaft and universal joint being located in line with the engine, transmission, and differential pot, and a body mounted upon the chassis and including cross seats one of which is located directly above the differential pot, and another of which seats is located in proximity to the transmission control handle and steering wheel, a longitudinally extending body frame member beneath the center line of the body, and a floor for the central portion of the body and between the seats, whereby said floor may be placed at a relatively low elevation, the differential pot being accommodated beneath the seat aforesaid, and whereby the transmission control handle and steering wheel may be brought adjacent to the end of the left front seat aforesaid, substantially as described.

3. In a motor vehicle, the combination of a chassis including front steering wheels and rear driving wheels, of an engine mounted in the front portion of the chassis to one side of the center line thereof, a transmission unit at the rear end of the engine and substantially in line therewith, a control handle reaching upwardly from said transmission unit at one side of the center line of the vehicle, a steering wheel located in close proximity to the transmission control handle aforesaid, a differential pot in the rear axle located to the same side of the center line of the vehicle and substantially in line with the engine and transmission aforesaid, a drive shaft reaching directly from the transmission to the differential pot, a universal joint in said drive shaft, both the drive shaft and universal joint being located in line with the engine, transmission, and differential pot, and a body mounted upon the chassis and including cross seats one of which is located directly above the differential pot, and another of which seats is located in proximity to the transmission control handle and steering wheel, and a floor for the central portion of the body and between the seats, whereby said floor may be placed at a relatively low elevation, the differential pot being accommodated beneath the seat aforesaid, and whereby the transmission control handle and steering wheel may be brought adjacent to the end of the front seat aforesaid, substantially as described.

4. In a motor vehicle, the combination of a chassis including front steering wheels and rear driving wheels, of an engine mounted in the front portion of the chassis to one side of the center line thereof, a differential pot in the rear axle located to the same side of the center line of the vehicle and substantially in line with the engine aforesaid, a drive shaft reaching between the differential pot and the engine, a universal joint in the drive shaft, and a body mounted upon the chassis and including cross seats one of which is located directly above the differential pot and another of which seats is located above the universal joint, and a floor for the central portion of the body and between the seats, whereby said floor may be placed at a relatively low elevation, the differential pot being accommodated beneath one seat and the universal joint beneath another seat, substantially as described.

5. In a motor vehicle, the combination of a chassis including front steering wheels and rear driving wheels, of an engine mounted in the front portion of the chassis to one side of the center line thereof, a differential pot in the rear axle located to the same side of the center line of the vehicle and substantially in line with the engine aforesaid, a drive shaft reaching between the differential pot and the engine, and a body mounted upon the chassis and including cross seats one of which is located directly above the differential pot, and a floor for the central portion of the body and between the seats, whereby said floor will be placed at a relatively low elevation, the differential pot being accommodated beneath one seat, substantially as described.

6. In a motor vehicle, the combination of a chassis including front steering wheels and rear driving wheels, of an engine mounted in the front portion of the chassis to one side of the center line thereof, a transmission unit at the rear end of the engine and substantially in line therewith, a control handle reaching upwardly from the transmission unit at the same side of the center line of the vehicle, a steering wheel located in close proximity to the transmission control handle aforesaid, and a body mounted upon the chassis and including a front cross seat, the end of which is located in proximity to the transmission control handle and steering wheel, whereby the transmission control handle and steering wheel may be brought adjacent to the end of said front seat, substantially as described.

GEORGE JOHN RACKHAM.